(12) United States Patent
Liu et al.

(10) Patent No.: US 11,526,802 B2
(45) Date of Patent: Dec. 13, 2022

(54) MODEL TRAINING USING A TEACHER-STUDENT LEARNING PARADIGM

(71) Applicant: International Business Machines Corporation, Armonk, NY (US)

(72) Inventors: Zhe Liu, San Jose, CA (US); Amita Misra, San Jose, CA (US); Pritam Gundecha, San Jose, CA (US); Jalal Mahmud, San Jose, CA (US); Yash Bhalgat, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 810 days.

(21) Appl. No.: 16/451,693

(22) Filed: Jun. 25, 2019

(65) Prior Publication Data
US 2020/0410388 A1     Dec. 31, 2020

(51) Int. Cl.
*G06F 16/951*     (2019.01)
*G06N 20/00*     (2019.01)
*G06K 9/62*     (2022.01)
*G06F 17/18*     (2006.01)

(52) U.S. Cl.
CPC .......... *G06N 20/00* (2019.01); *G06F 16/951* (2019.01); *G06F 17/18* (2013.01); *G06K 9/6256* (2013.01); *G06K 9/6267* (2013.01)

(58) Field of Classification Search
CPC .............................. G06F 17/18; G06F 16/248
See application file for complete search history.

(56) References Cited

U.S. PATENT DOCUMENTS

2014/0187427 A1*    7/2014   Macready ............... G06N 5/02
                                                                     706/46
2016/0042294 A1*    2/2016   Macready ............... G06N 5/02
                                                                     706/10

FOREIGN PATENT DOCUMENTS

| CN | 102324046 A | 1/2012 |
|---|---|---|
| CN | 104318242 A | 1/2015 |
| CN | 104794500 A | 7/2015 |
| WO | 2018141942 A1 | 8/2018 |

OTHER PUBLICATIONS

Li, J. "A Novel Semi-supervised SVM Based on Tri-training for Intrusition Detection," Journal of Computers, vol. 5, No. 1, Apr. 2010, pp. 638-645, Academy Publisher.
(Continued)

*Primary Examiner* — Baoquoc N To
(74) *Attorney, Agent, or Firm* — Jorge R. Maranto

(57) ABSTRACT

A method and a system for model training are provided. The method can include training a first classifier, a second classifier, and a third classifier with subsets of a labeled dataset. The method can also include predicting a pseudo labeled dataset from an unlabeled dataset using the first classifier, the second classifier, and the third classifier. The method further includes assigning a role to the first classifier, to the second classifier, and to the third classifier. The method can further include selecting a teaching sample dataset from the pseudo labeled dataset based on the role assigned to the third classifier, wherein the third classifier is assigned a role of a student. The method can also include retraining the third classifier with the teaching sample dataset in conjunction with a subset of the labeled dataset.

20 Claims, 6 Drawing Sheets

(56) References Cited

OTHER PUBLICATIONS

Saito et al., "Asymmetric Tri-training for Unsupervised Domain Adaptation," arXiv.org > cs > arXiv:1702.08400, v3, May 13, 2017, 12 pages.
Sogaard, A., "Simple semi-supervised training of part-of-speech taggers," Proceedings of the ACL 2010 Conference Short Papers, Jul. 2010, pp. 205-208, Association for Computational Linguistics.
Zhou, Z., "Tri-Training—Exploiting Unlabeled Data Using Three Classifiers," IEEE Transactions on Knowledge and Data Engineering, vol. 17, No. 11, Nov. 2005, pp. 1529-1541, IEEE Computer Society.
Zhou, Y., "Democratic Co-Learning," Proceedings of the 16th IEEE International Conference on Tools with Artificial Intelligence (ICTAI 2004), 2004, 9 pages, IEEE Computer Society.
Blum et al., "Combining Labeled and Unlabeled Data with Co-Training," COLT' 98: Proceeding of the eleventh annual conference on Computational Learning Theory, Jul. 1998, pp. 92-100, ACM.
Triguero et al., "Self-labeled techniques for semi-supervised learning: taxonomy, software and empirical study," Knowledge and Information Systems, Feb. 2015, vol. 42, Issue 2, pp. 245-284, Springer.
Yarowsky, D., "Unsupervised Word Sense Disambiguation Rivaling Supervised Methods," ACL' 95: Proceedings of the 33rd annual meeting on Association for Computational Linguistics, Jun. 1995, pp. 189-196.
Chou et al., "Boosted Web Named Entity Recognition via Tri-Training," Journal, ACM Transaction on Asian and Low-Resource Language Information Processing (TALLIP)—TALLIP Notes and Regular Papers, vol. 16, Issue 2, Oct. / Dec. 2016, Article No. 10, pp. 1-23.
Ruder et al., "Knowledge Adaptation: Teaching to Adapt," arXiv.org > cs > arXiv:1702.02052, v1, Feb. 7, 2017, 11 pages.
Zhu, X., "Semi-Supervised Learning Literature Survey," Computer Sciences TR 1530, Dec. 9, 2006, pp. 1-52.
Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.
Armand Joulin, Edouard Grave, Piotr Bojanowski, and Tomas Mikolov. 2017. Bag of Tricks for Efficient Text Classification. In Proceedings of the 15th Conference of the European Chapter of the Association for Computational Linguistics: vol. 2, Short Papers, pp. 427-431, Valencia, Spain. Association for Computational Linguistics.
Preslav Nakov, Alan Ritter, Sara Rosenthal, Fabrizio Sebastiani, and Veselin Stoyanov. 2016. SemEval—2016 Task 4: Sentiment Analysis in Twitter. In Proceedings of the 10th International Workshop on Semantic Evaluation (SemEval—2016), pp. 1-18, San Diego, California. Association for Computational Linguistics.

* cited by examiner

MODEL TRAINING USING A TEACHER-STUDENT LEARNING PARADIGM

BACKGROUND

The present disclosure relates to model training, and more specifically, to model training based on a semi-supervised training method using a teacher-student paradigm technique.

Typical semi-supervised training methods include self-training, co-training, tri-training, and tri-training with disagreement. Co-training involves two classifiers learning from each other to achieve better performance. Tri-training involves adding training samples to a third classifier if the other two classifiers agree on the predicted labels. In tri-training with disagreement, conditions are imposed where two base classifiers must agree on a prediction where the prediction exceeds a static confidence threshold. The third classifier must disagree with the other two base classifiers. Once the conditions are met, the training iteration can occur.

SUMMARY

Various embodiments are directed to a method of model training using a teacher-student learning paradigm. The method can include training a first classifier, a second classifier, and a third classifier with subsets of a labeled dataset. The subsets can be determined using a bootstrap sampling technique or other various ways to increase diversity of the classifiers trained. The method can also include predicting a pseudo labeled dataset from an unlabeled dataset using the first classifier, the second classifier, and the third classifier. The pseudo labeled dataset set can include suggested labels and prediction probabilities for the samples within the pseudo labeled dataset. The method further includes assigning a role to the first classifier, to the second classifier, and to the third classifier. Each role given to the classifiers is based on prediction thresholds and labeling agreements. The method can further include selecting a teaching sample dataset from the pseudo labeled dataset based on the role assigned to the third classifier, wherein the third classifier is assigned a role of a student. The method can also include retraining the third classifier with the teaching sample dataset in conjunction with a subset of the labeled dataset. After retraining, the method can include updating the prediction thresholds for role assignment and reaching a stopping criterion.

Further embodiments are directed to a computer program product for model training using a teacher-student learning paradigm on a system, which can include a computer readable medium having program instructions therewith, the program instructions executable by a processor to cause the system to execute instructions. The instructions can cause the system to train a first classifier, a second classifier, and a third classifier with subsets of a labeled dataset. The subsets can be determined using a bootstrap sampling technique or other various ways to increase diversity of the classifiers trained. The instructions can further cause the system to predict a pseudo labeled dataset from an unlabeled dataset using the first classifier, the second classifier, and the third classifier. The pseudo labeled dataset set can include suggested labels and prediction probabilities for the samples within the pseudo labeled dataset. The instructions can also cause the system to assign a role to the first classifier, to the second classifier, and to the third classifier. Each role given to the classifiers is based on prediction thresholds and labeling agreements. The instructions can further cause the system to select a teaching sample dataset from the pseudo labeled dataset based on the role assigned to the third classifier, wherein the third classifier is assigned a role of a student. The instructions can also cause the system to retrain the third classifier with the teaching sample dataset in conjunction with a subset of the labeled dataset. After retraining, the instructions can cause the system to update the prediction thresholds for role assignment and to reach a stopping criterion.

Additional embodiments are directed to a system, which can include at least one processing component and at least one memory component. The system can also include, a labeled dataset, an unlabeled dataset, classifiers for training and prediction, a pseudo labeled dataset, a role assigner configured to assign roles to the various classifiers in the system, a teaching sample dataset, and a stopping criterion component. The memory component can also include program instructions which cause the system to train a first classifier, a second classifier, and a third classifier with subsets of a labeled dataset. The subsets can be determined using a bootstrap sampling technique or other various ways to increase diversity of the classifiers trained. The instructions can further cause the system to predict a pseudo labeled dataset from an unlabeled dataset using the first classifier, the second classifier, and the third classifier. The pseudo labeled dataset set can include suggested labels and prediction probabilities for the samples within the pseudo labeled dataset. The instructions can also cause the system to assign a role to the first classifier, to the second classifier, and to the third classifier. Each role given to the classifiers is based on prediction thresholds and labeling agreements. The instructions can further cause the system to select a teaching sample dataset from the pseudo labeled dataset based on the role assigned to the third classifier, wherein the third classifier is assigned a role of a student. The instructions can also cause the system to retrain the third classifier with the teaching sample dataset in conjunction with a subset of the labeled dataset. After retraining, the instructions can cause the system to update the prediction thresholds for role assignment and to reach a stopping criterion.

BRIEF DESCRIPTION OF THE DRAWINGS

These and other features, aspects, and advantages of the embodiments of the disclosure will become better understood with regard to the following description, appended claims, and accompanying drawings where:

Figure 1:
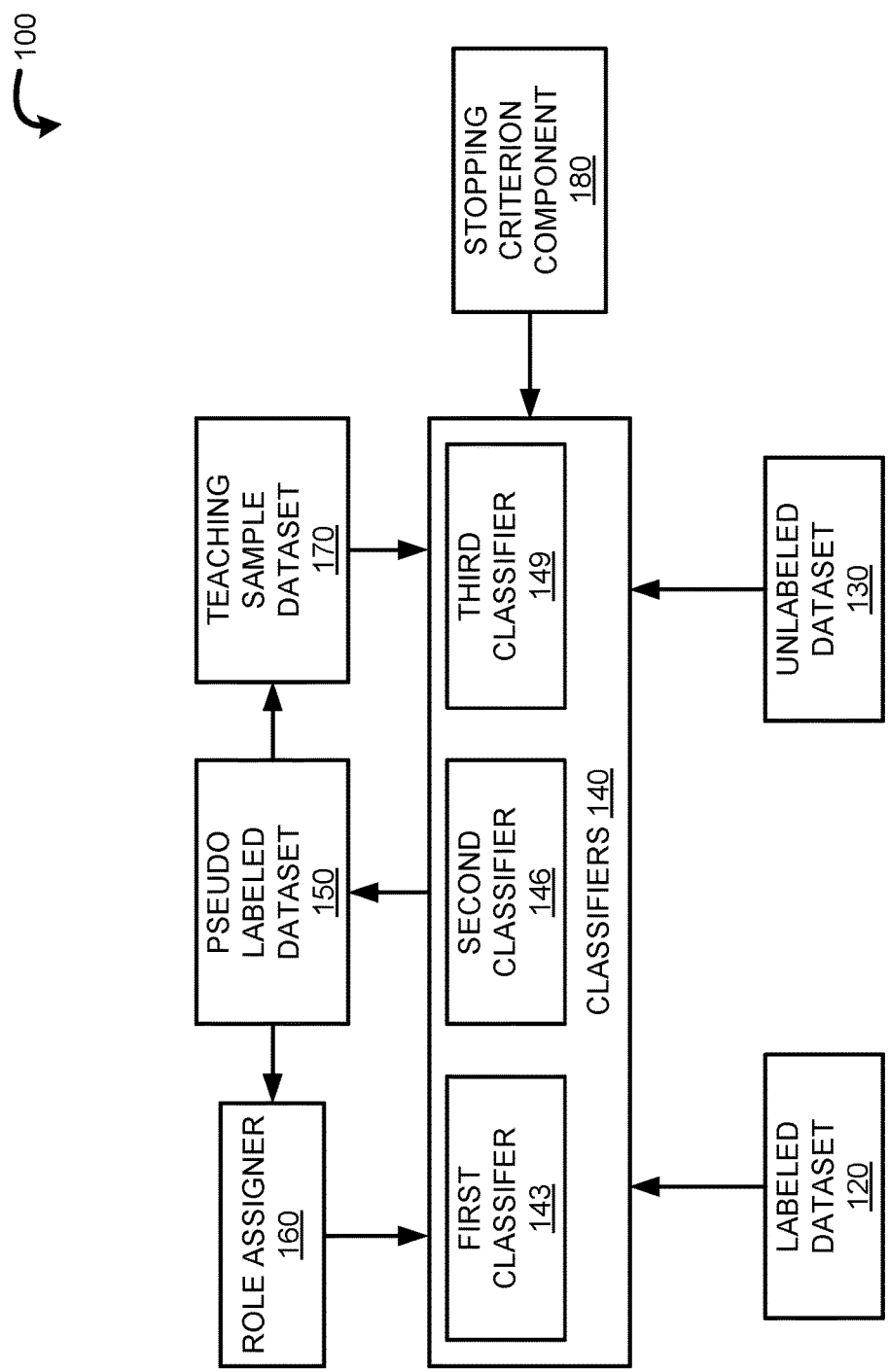
FIG. 1 is a block diagram illustrating a model training system, according to embodiments of the present disclosure.

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numeral are used to designate like parts in the accompanying drawings.

DETAILED DESCRIPTION

Machine learning algorithms, or classifiers, are typically trained using techniques such as supervised learning, semi-supervised learning, unsupervised learning, and reinforcement learning. The goal of these machine learning techniques is to construct a model that can take an input and produce a desired result. The desired results produced by a model can be measured by the accuracy of the given result. To improve the results, models need to be trained. Based on the type of learning technique employed, machine learning algorithms train using various forms of data to improve, at least in part, the accuracy of their results. These forms of data can include labeled data, unlabeled data, or a combination of labeled and unlabeled data. However, data, such as labeled data, can be difficult and expensive to acquire.

To alleviate some of the expense and availability of labeled data, semi-supervised learning incorporates unlabeled data in conjunction with labeled data to train classifiers. Typical semi-supervised learning techniques include self-training, co-training, tri-training, and tri-training with disagreement. In self-training, an initial classifier is trained using a labeled dataset. Then, the classifier is used to make predictions on an unlabeled dataset. The samples with the highest prediction probabilities, or confidence, are added to a training set and used to retrain the classifier. In co-training, two base classifiers are initially trained using a labeled dataset. At every iteration, each classifier selects a sample dataset of the most confidently predicted unlabeled samples. These sample datasets are added to a training set of the other classifier and are used to train each other. In tri-training, three classifiers are utilized. After initially training the classifiers with a labeled dataset, predictions are made on an unlabeled dataset using two classifiers. A sample of the pseudo labeled dataset is only added to a training dataset if the two classifiers agree. The training dataset is then used to retrain the third classifier.

Commonly, self-labeling algorithms, such as algorithms utilizing semi-supervised learning techniques or unsupervised learning techniques, provide inaccurate measurements during the iterative process. This can lead to an increase in noise for the model. Noise is a distortion in data, that is unwanted by the perceiver of the data. Noise can be anything that is spurious or extraneous to the original data, that is not intended to be present, but was introduced due to a faulty process. The increase in noise can be attributed, at least partially, to labeling methods that rely on either single or aggregated prediction confidences derived from the base model that are used for selection and labeling of the unlabeled examples.

Another possible cause of performance reduction in self-labeling algorithms is the lack of an effective stopping criterion. A stopping criterion is the deciding point, during the iterative training process, where an algorithm stops adding instances to the labeled dataset. This can be critical to the algorithm's ability to work properly. A common type of stopping criterion used by existing self-labeling techniques is to set a threshold on the number of labels the algorithms are willing to generate. Another common type of stopping criterion is to stop the self-labeling algorithms when little to no accuracy increase occurs during a training iteration. Stopping criteria that is too conservative or too liberal may produce mislabeled examples during the self-labeling process which can lead to a model that performs poorly.

To improve upon the self-labeling techniques described above, the present disclosure provides for a semi-supervised learning technique that incorporates a student-teacher paradigm into the learning process.

Disclosed herein are a method and a system for model training using a teacher-student paradigm. The method can include training a first classifier, a second classifier, and a third classifier with subsets of a labeled dataset. The subsets can be determined using a bootstrap sampling technique or other various ways to increase diversity of the classifiers trained. The method can also include predicting a pseudo labeled dataset from an unlabeled dataset using the first classifier, the second classifier, and the third classifier. The pseudo labeled dataset set can include suggested labels and prediction probabilities for the samples within the pseudo labeled dataset. The method further includes assigning a role to the first classifier, to the second classifier, and to the third classifier. Each role given to the classifiers is based on prediction thresholds and labeling agreements. The method can further include selecting a teaching sample dataset from the pseudo labeled dataset based on the role assigned to the third classifier, wherein the third classifier is assigned a role of a student. The method can also include retraining the third classifier with the teaching sample dataset in conjunction with a subset of the labeled dataset. After retraining, the method can include updating the prediction thresholds for role assignment and reaching a stopping criterion.

FIG. 1 is a block diagram illustrating a model training system 100, according to embodiments of the present disclosure. The model training system 100 includes a labeled dataset 120, an unlabeled dataset 130, classifiers 140, a pseudo labeled dataset 150, a role assigner 160, a teaching sample dataset 170, and a stopping criterion component 180. The classifiers 140 can include, but are not limited to, a first classifier 143, a second classifier 146, and a third classifier 149.

The labeled dataset 120 is a set of data used by the model training system 100 to initially train the classifiers 140. The labeled dataset 120 includes a group of data samples, or samples, that have been tagged with one or more labels. A label can typically include one or more meaningful tags that are informative regarding the sample. For example, labels might indicate that a photograph contains a vehicle, on a roadway, next to a stop sign. In another example, a sample may be an audio recording with labels that indicate what words are spoken in the recording.

The unlabeled dataset 130 is a set of data used by the model training system 100 to predict the pseudo labeled dataset 150. The unlabeled dataset 130 includes a group of samples that have not been tagged with any labels. For example, an unlabeled dataset 130 may include photographs, video recordings, audio recordings, or any other type of untagged data. The unlabeled dataset 130 can be applied to trained classifiers to find and label structures within this data.

The classifiers 140 are components of the model training system 100 configured to assign labels to data samples. For example, the classifiers 140 can perform predictive analysis, spam detection, pattern detection, image classification, as well other types of categorical classifications. The classifiers 140 can employ different algorithmic methods to map and label the inputted data. For example, the classifier 140 may be a perceptron, a Naïve Bayes, a decision tree, a logistic regression, a k-nearest neighbor, a neural network, a support vector machine, or any other type of algorithm capable of classification. The classifiers 140 are further configured to provide a prediction probability for each label predicted. For example, if the classifiers 140 predict an email as spam, that prediction is accompanied with a prediction probability, or confidence level, the classifier 140 has in providing that prediction. The prediction probability can be a percentage range from 0 to 100% depending on the confidence of the classifier. It should be noted that other forms of prediction probability can also show the confidence level of a predicted label by a given classifier. As the classifiers 140 are trained, their prediction probabilities can also increase with each training iteration. The classifiers 140 can go through training iterations until the classifiers 140 reach a prediction probability threshold that is satisfactory for the task given to a model.

In some embodiments, the classifiers 140 include the first classifier 143, the second classifier 146, and the third classifier 149. Embodiments of the present disclosure require at least three classifiers to apply a teacher-student learning paradigm. Embodiments discussed herein demonstrate the present disclosure using only three classifiers, but it should not be seen as limiting the present disclosure. Various other embodiments may utilize more than three classifiers to implement various permutations of the teacher student paradigm disclosure.

The pseudo labeled dataset 150 is a set of data, used by the model training system 100, containing samples that include approximate labels and accompanying prediction probabilities provided by the classifiers 140. The pseudo labeled dataset 150 is generated by the classifiers 140 when the unlabeled dataset 130 is applied to the classifiers 140 after being trained by the labeled dataset 120.

The role assigner 160 is a component of the model training system 100 configured to assign roles to the classifiers 140. The role assigner 160 can include a teacher threshold and a student threshold. Based on each threshold the pseudo labeled dataset, the role assigner 160 can assign a classifier within the classifiers 140 to a teacher role or a student role. In each training iteration, a first classifier 143 and a second classifier 146 are assigned roles of teachers if their prediction probabilities exceed or meet the teacher threshold. A third classifier 149 is assigned a student role if its prediction probability is less than the student threshold. The role assigner 160 is further configured to ensure that at least two teacher classifiers are identified. This can assist in preventing bias in any of the models from affecting the quality of the information taught to the student classifier.

In some embodiments, the role assigner 160 rotates the role assignments after each training iteration. For example, the first classifier 143 can be assigned as the student classifier while the second classifier 146 and the third classifier 149 can be assigned the teacher classifier. By rotating the assigned roles, each classifier can learn from the other classifiers' experiences.

The teaching sample dataset 170 is a set of data, used by the model training system 100, containing teaching samples. The teaching samples are selected from the pseudo labeled dataset 150 that are determined to be teachable to the classifier 140 assigned as the student classifier. A teaching sample is a sample where the predicted labels from the teacher classifiers agree with each other. Also, the prediction probabilities of the teaching sample of both of the teacher classifiers exceed the teacher threshold. The prediction probability for the student classifier must also be below the student threshold. Thus, when a sample meets the required teaching sample criteria, it can be added to the teaching sample dataset 170. The teaching sample dataset 170 can be used to retrain the student classifier to improve its prediction probability.

The stopping criterion component 180 is a component of the model training system 100 configured to determine whether the classifiers 140 have met a stopping criterion. The stopping criterion component 180 can compare the student threshold with the teacher threshold during each training iteration. When the student threshold reaches the teacher threshold, the stopping criterion has been met and the training cycle can conclude.

Figure 2:
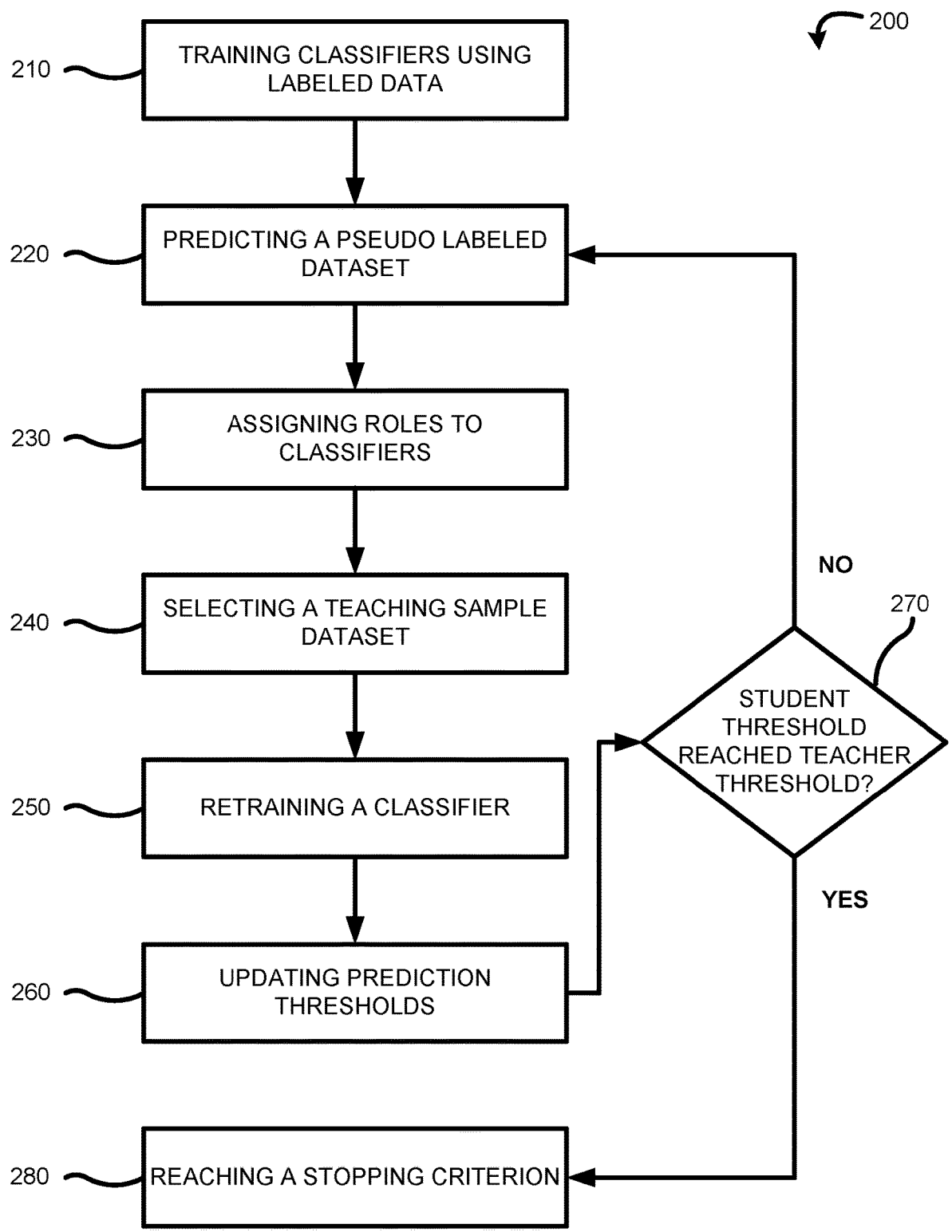
FIG. 2 is a flow diagram illustrating a process of training a model based on a teacher-student paradigm, according to embodiments of the present disclosure.

FIG. 2 is a flow diagram illustrating a process 200 of training a model based on a teacher-student paradigm, according to embodiments of the present disclosure. To illustrate process 200, FIG. 2 is described within the context of the model training system 100 of FIG. 1.

The first classifier 143, the second classifier 146, and the third classifier 149 are each trained from subsets of the labeled dataset 120. This is illustrated at step 210. In some embodiments, the subsets are a result of bootstrapped labeled data. Bootstrapping occurs when the classifiers 140 are initially trained with a limited amount of labeled data and retrained with positive samples derived from the classifiers. In some other embodiments, the subsets can be determined by an independent random feature split. An independent random feature split can be achieved by selecting samples from the labeled dataset 120 randomly. The sequence in which the sample are taken are not dependent on any other samples or data. By providing randomized sampling, the diversity of the classifiers 140 can increase. The classifiers 140 can also be trained with a variety of methods. These methods can include, for example, generative models, low-density separation methods, graph-based methods, as well various other heuristic methods.

Once trained, an unlabeled dataset 130 is applied to each of the classifiers to predict and generate a pseudo labeled dataset. This is illustrated at step 220. In some embodiments, a subset of the unlabeled dataset is applied to each of the classifiers 140. For example, a subset of the unlabeled dataset can be generated that is sufficiently large enough for a training iteration. Enough samples can be generated such that a student classifier can be retrained with the appropriate samples. Depending on the size the unlabeled dataset, multiple subsets can be generated and applied during a training iteration. A pseudo labeled dataset 150 can be generated once the classifiers 140 predict and label samples from the unlabeled dataset 130. The pseudo labeled dataset can include predicted labels from each of the classifiers 140 accompanied with prediction probabilities for each predicted label.

The role assigner 160 can assign each of the classifiers 140 to a role. This is illustrated at step 230. In some embodiments, the role assigner 160 assigns at least two teacher roles and a student role based on the prediction probabilities compared to predetermined thresholds of each of the classifiers 140 in the pseudo labeled dataset 150. For example, the first classifier 143 and the second classifier 146 can be assigned teacher roles if their prediction probabilities for a predicted label of a sample from the pseudo labeled dataset 150 exceed the teacher threshold. For the same sample, if the third classifier 149 has a prediction probability lower than the student threshold, then the third classifier 149 can be assigned the student role. Take for instance if the teacher threshold is set to 95% prediction probability, a confidence level of a classifier would need to exceed that 95% in order to be assigned a role of a teacher. With that same reasoning, if a student threshold is set to 50% prediction probability, a confidence level of a classifier would have to be below 50% in order to be assigned a role of a student.

A teaching sample dataset 170 is selected from the pseudo labeled dataset 150. This is illustrated at step 240. The teaching sample dataset 170 can be selected from the pseudo labeled dataset 150 based on the prediction probabilities of the classifiers 140 as well as the labelling agreements of the teacher classifiers. A sample from the pseudo labeled dataset 150 can be added to the teaching sample dataset 170 if the sample's label is agreed upon by the teacher classifiers. Also, the prediction probabilities of the teacher classifiers must exceed the teacher threshold. Further, the prediction probability of the student threshold must also be below the student threshold. If the criteria are met, the sample can be placed into the teaching sample dataset 170. Take for example that the first classifier 143 and the second classifier 146 are teacher classifiers and the third classifier 149 is a student classifier. For a given sample, when the label predictions of the first classifier 143 and the second classifier 146 agree and those same labels each have a confidence level greater than the teacher threshold while the third classifier 149 has a confidence level for the sample below the student threshold, then that sample is added to the teaching sample dataset. The label prediction made by the third classifier 149, or student classifier, need not agree or disagree with the teacher classifiers. The only requirement needed is that the prediction probability for a sample be below the student threshold. In some embodiments, the teacher classifiers need only reach the teacher threshold for a sample to be added to the teaching sample dataset 170.

In some embodiments, the teaching sample dataset 170 determines the roles the classifiers 140 are assigned. A teaching sample dataset 170 for each of the classifiers 140 can be generated from the pseudo labeled dataset where two classifiers are teacher classifiers, and one classifier is a student classifier. Given three classifiers, a teaching sample dataset can be generated for each of the three classifiers in one iteration of the training cycle.

The student classifier is retrained using the teaching sample dataset 170 and the labeled dataset. This is illustrated at step 250. In some embodiments, the subset of the labeled dataset 120 that was used to train the student classifier is combined with the teaching sample dataset 170 to retrain the student classifier. In some embodiments, the teaching sample dataset 170 is added to the bootstrapped labeled dataset used to train the classifiers 140 at step 210. In some embodiments, each of the classifiers 140 that have a generated teaching sample dataset 170 from the pseudo labeled dataset 150 are trained with their respective generated teaching sample dataset 170. For example, if some samples from the pseudo labeled dataset 150 meet the criteria in such a way that the first classifier 143 is the student while other samples meet the criteria where the third classifier 149 is determined to be the student, then the first classifier 143 can be trained with its samples and the third classifier 149 can be trained with its own samples.

After retraining, the teacher threshold and the student threshold are updated. This is illustrated at step 260. In some embodiments, the teacher threshold is decreased, and the student threshold is increased by a predetermined increment. To adjust the teacher and student thresholds, a static or adaptive increment can be used to change the thresholds in every iteration. For example, the thresholds may be updated by a static number such as 3%. If the teacher threshold is determined to be at 90% then the threshold would be decreased to 87%, and if the student threshold is determined to be 50% then the threshold would increase to 53%.

In some embodiments, the teacher threshold and the student threshold are adjusted based on separate increments. A predetermined teacher increment may be set to decrease the teacher threshold after each iteration and a predetermined student increment may be set to increase the student threshold after each iteration. By having independent increments, the present disclosure can be adjusted to improve the performance of the classifiers in each iteration.

In some embodiments, an adaptive increment is used to decrease the teacher threshold and increase the student threshold. The adaptive increment can be adjusted after each iteration to optimize the training cycle of the classifiers. The adaptive increment can be adjusted based on the teaching sample dataset size, the increase of prediction probability of the classifiers, or by other factors an operator sees fit to use.

A determination is made whether the student threshold has reached the teacher threshold. This is illustrated at step 270. During each training iteration, the student threshold and teacher threshold are adjusted and updated. After the adjustment, the process 200 can determine whether the student threshold has reached that of the teacher threshold. Generally, when the student threshold reaches the same confidence level as the teacher threshold the training can be considered sufficiently complete. At this point, adding samples to a teaching sample dataset 170 may not necessarily contribute to an increase in the prediction probability of a classifier. Also, an increase in noise may result if too many iterations are conducted on the classifiers 140. In the event that the student threshold has not reached the confidence level of the teacher threshold, the process 200 returns to step 220. However, if the student threshold has reached that of the teacher threshold, the stopping criterion has been met and the training cycle is complete. This is illustrated at step 280.

In some embodiments, a final prediction can be provided based on a majority vote of the trained classifiers 140. The first classifier 143, the second classifier 146, and the third classifier 149 can provide predictions to a dataset. The predictions that are agreed upon by a majority of the classifiers 140 can be provided as an end result.

Figure 3:
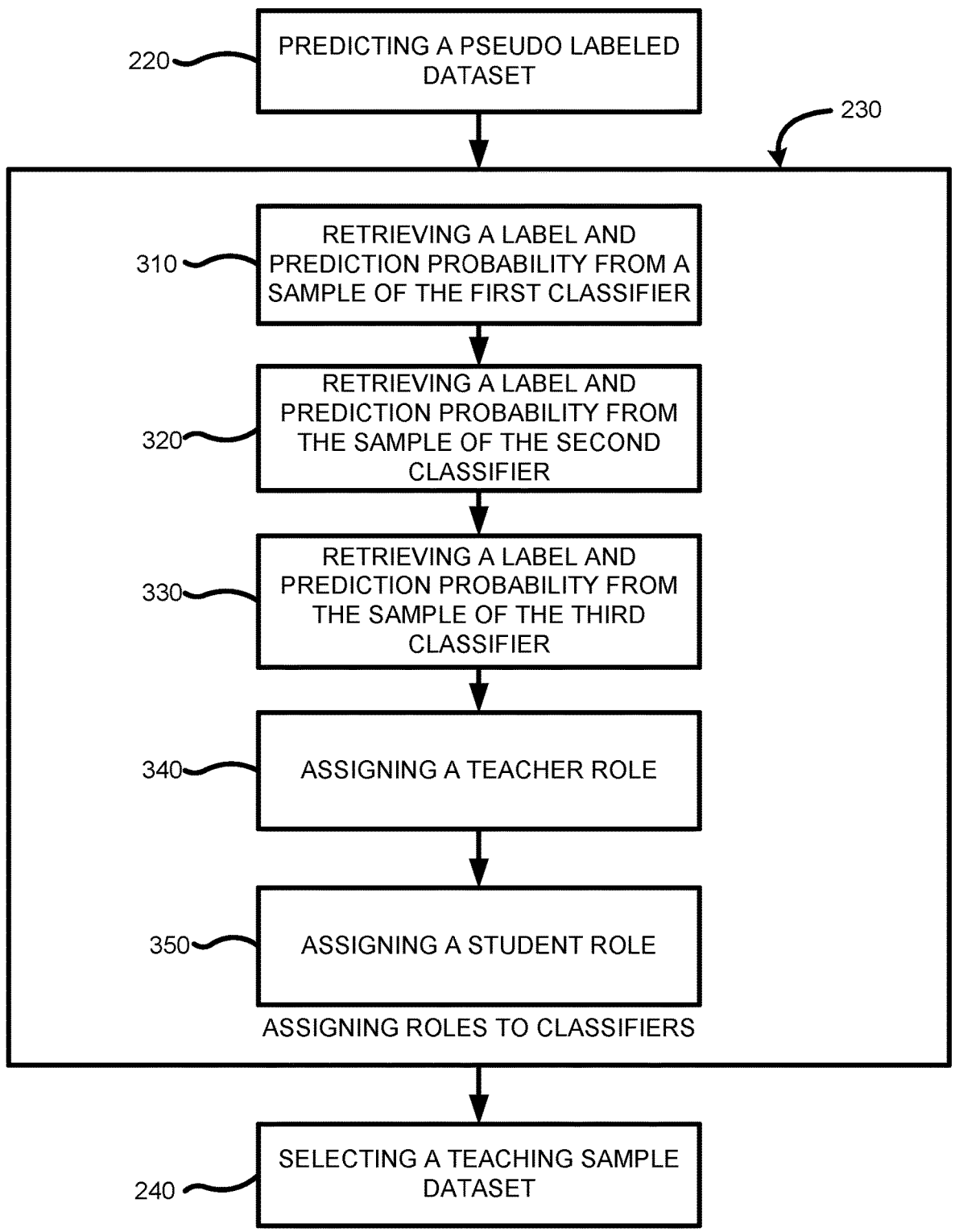
FIG. 3 is a flow diagram illustrating a process of assigning roles to classifiers, according to embodiments of the present disclosure.

FIG. 3 is a flow diagram illustrating the process step 230 of assigning roles to classifiers from FIG. 2, according to various embodiments of the present disclosure. To illustrate process step 230, FIG. 3 is described within the context of the model training system 100 of FIG. 1.

A first label with a corresponding prediction probability predicted by the first classifier 143 from a sample is retrieved. This is illustrated at step 310. A second label with a corresponding prediction probability predicted by the second classifier 146 from the same sample is also retrieved. This is illustrated at step 320. A third label with a corresponding prediction probability predicted by the third classifier 149 from the same sample is also retrieved. This is illustrated at step 330.

Based on the labels and predictions probabilities retrieved, the first classifier 143 and the second classifier 146 are assigned a teacher role. This is illustrated at step 340. To be assigned the teacher role, the prediction probability of the first classifier 143 and the prediction probability of the second classifier 146 exceed or meet a predetermined teacher threshold. Also, the label predicted by the first classifier 143 and the label predicted by the second classifier 146 must agree. If the criteria are met, the first classifier 143 and the second classifier 146 can be assigned as a teacher for that sample.

The third classifier is assigned a role of a student based on the prediction probability retrieved. This is illustrated at step 350. To be assigned the student role, the prediction probability of the third classifier 149 must be below or meet a predetermined student threshold.

If a sample cannot assign be assigned at least two teacher classifiers and a student classifier, then the sample is not considered an ideal training sample and will not be placed into a teaching sample dataset.

Figure 4:
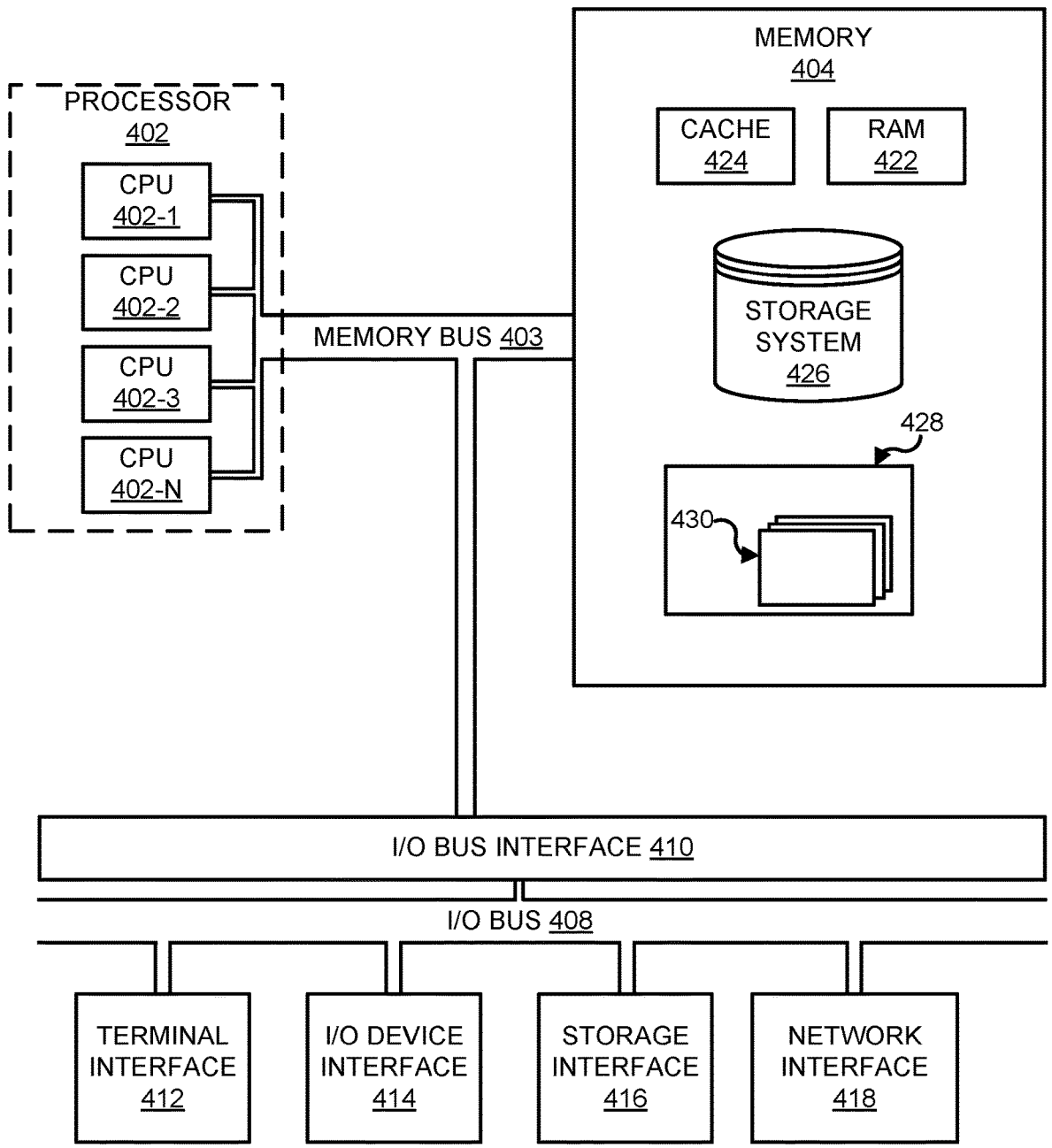
FIG. 4 is a high-level block diagram illustrating an example computer system that may be used in implementing one or more of the methods, tools, and modules, and any related functions, described herein, according to embodiments of the present disclosure.

Referring now to FIG. 4, shown is a high-level block diagram of an example computer system 400 (e.g., model training system 100) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 400 may comprise one or more processors 402, a memory 404, a terminal interface 412, a I/O (Input/Output) device interface 414, a storage interface 416, and a network interface 418, all of which may be communicatively coupled, directly or indirectly, for inter-component communication via a memory bus 403, a I/O bus 408, and an I/O bus interface 410.

The computer system 400 may contain one or more general-purpose programmable central processing units (CPUs) 402-1, 402-2, 402-3, and 402-N, herein generically referred to as the processor 402. In some embodiments, the computer system 400 may contain multiple processors typical of a relatively large system; however, in other embodiments the computer system 400 may alternatively be a single CPU system. Each processor 402 may execute instructions stored in the memory 404 and may include one or more levels of on-board cache. In some embodiments, the processor 402 executes the processes included herein (e.g., process 200, 230).

The memory 404 may include computer system readable media in the form of volatile memory, such as random-access memory (RAM) 422 or cache memory 424. Computer system 400 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

Although the memory bus 403 is shown in FIG. 4 as a single bus structure providing a direct communication path among the processors 402, the memory 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 400 may, in some embodiments, contain multiple I/O bus interface units, multiple I/O buses, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 400 may be a multi-user mainframe computer system, a single-user system, or a server computer or similar device that has little or no direct user interface but receives requests from other computer systems (clients). Further, in some embodiments, the computer system 400 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 400. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
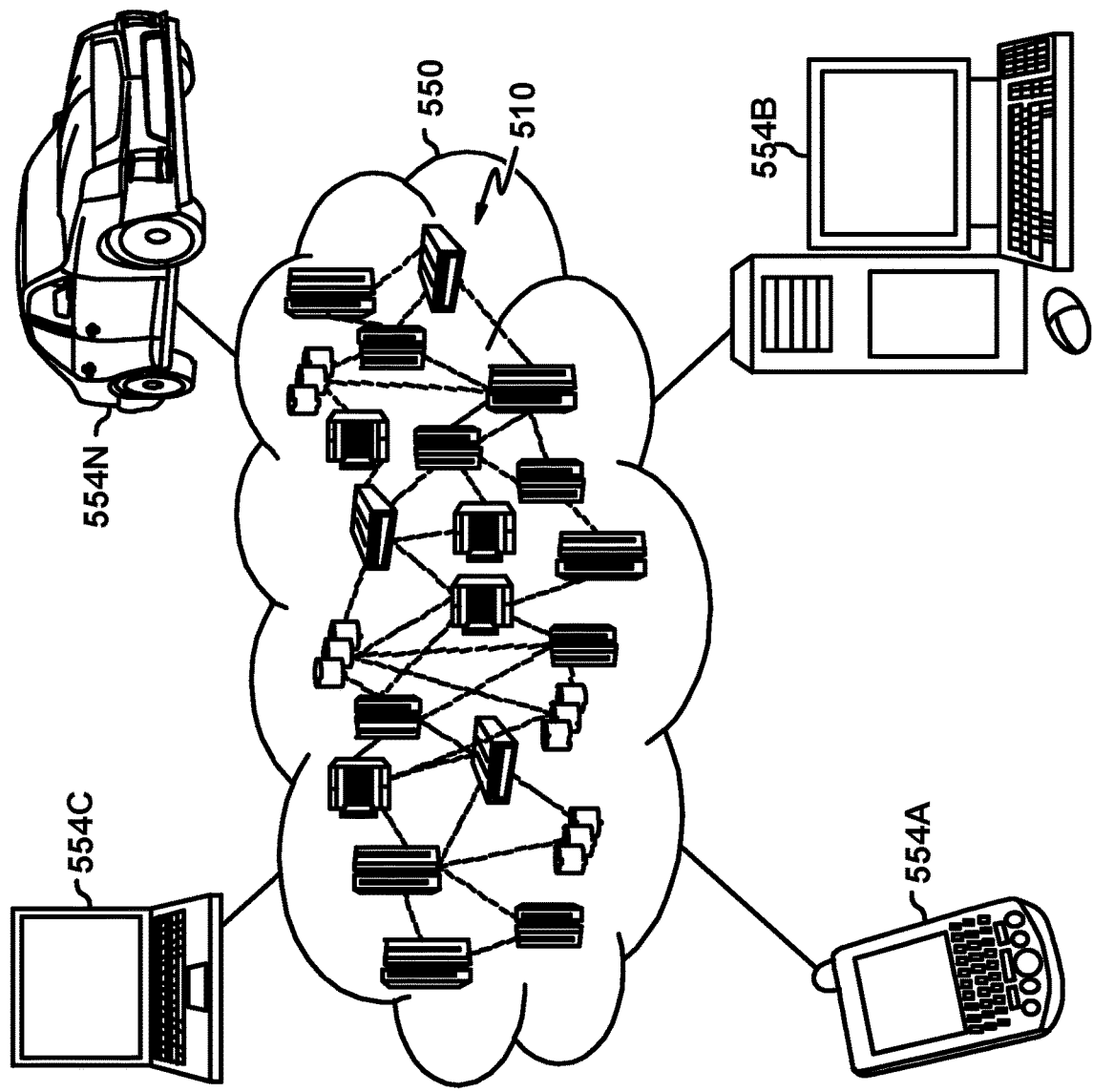
FIG. 5 depicts a cloud computing environment according to embodiments of the present disclosure.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
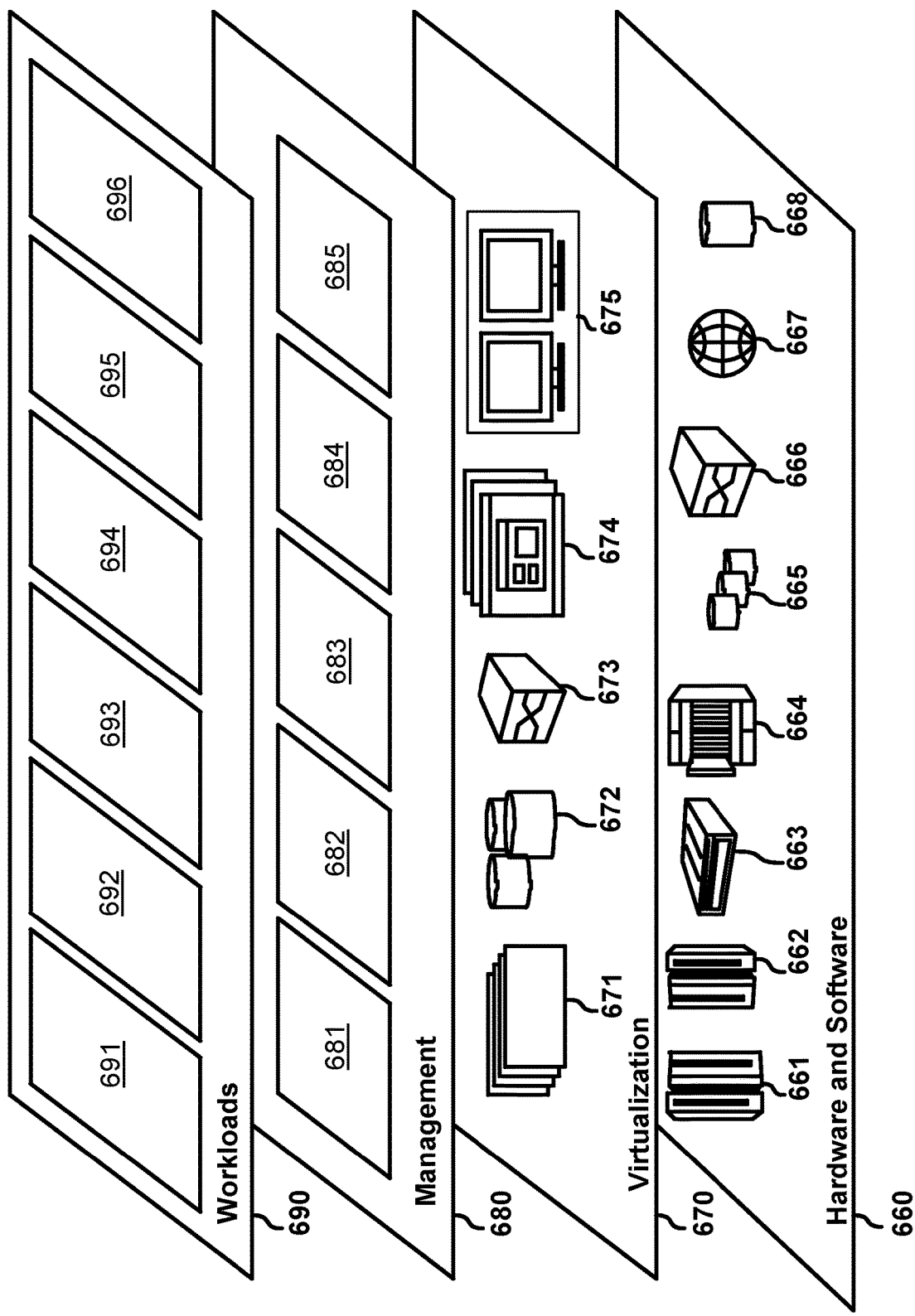
FIG. 6 depicts abstraction model layers according to an embodiment of the present disclosure.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 include hardware and software components. Examples of hardware components include: mainframes 661; RISC (Reduced Instruction Set Computer) architecture-based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and model training using a teacher-student learning paradigm 696.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a first classifier and a second classifier configured to be trained using subsets of a labeled dataset, wherein the first classifier and the second classifier having prediction probabilities that exceed a teacher threshold when predicting a pseudo labeled dataset from an unlabeled dataset;
a third classifier configured to be trained using the subsets of the labeled dataset, wherein the third classifier having a prediction probability below a student threshold when predicting the pseudo labeled dataset;
a role assigner configured to assign teacher roles and student roles to the first classifier, the second classifier, and the third classifier based on prediction probabilities of samples from the unlabeled dataset; and
a teaching sample dataset from the pseudo labeled dataset, wherein the teaching sample dataset includes at least one of the samples from the pseudo labeled dataset, wherein the first classifier and the second classifier agree on a label of the sample and the prediction probabilities exceed the teacher threshold and where the prediction probability of the third classifier is below the student threshold.

2. The system of claim 1, wherein the subsets are independent feature sets determined by a random feature split.

3. The system of claim 1, wherein the subsets are determined by a bootstrapped labeled dataset of the labeled dataset.

4. The system of claim 1, wherein the teacher threshold and the student threshold are adjustable after a training iteration.

5. The system of claim 1, further comprising a stopping criterion component configured to determine whether the system has reached a stopping criterion.

6. The system of claim 5, wherein the stopping criterion is determined when the student threshold is at least as high as the teacher threshold.

7. A method comprising:
training a first classifier, a second classifier, and a third classifier using subsets of a labeled dataset;
predicting a pseudo labeled dataset from an unlabeled dataset using the first classifier, the second classifier, and the third classifier;
assigning a role to the first classifier, the second classifier, and the third classifier based on prediction thresholds and labeling agreements;
selecting a teaching sample dataset from the pseudo labeled dataset based on the role assigned to the third classifier;
retraining the third classifier using the teaching sample dataset and the labeled dataset;
updating the prediction thresholds; and
reaching a stopping criterion.

8. The method of claim 7, wherein assigning the role comprises:
retrieving a first label and a corresponding first prediction probability of the first classifier made to a sample of the pseudo labeled dataset;
retrieving a second label and a corresponding second prediction probability of the second classifier made to the sample of the pseudo labeled dataset;
retrieving a third label and a corresponding third prediction probability of the third classifier made to the sample of the pseudo labeled dataset;
assigning a teacher role to the first classifier and the second classifier based on the first prediction probability and the second prediction probability exceeding a teaching threshold and based on the first label being in agreement with the second label; and
assigning a student role to the third classifier based on the third prediction probability not exceeding a student threshold.

9. The method of claim 7, wherein the subsets are independent feature sets determined by an independent random feature split.

10. The method of claim 7, wherein the subsets are determined by a bootstrapped labeled dataset of the labeled dataset.

11. The method of claim 7, wherein updating the prediction thresholds comprises:
decreasing a teacher threshold of the prediction thresholds by a teaching increment; and
increasing a student threshold of the prediction thresholds by a learning increment.

12. The method of claim 11, wherein the teaching increment and the learning increment are static increments.

13. The method of claim 11, wherein the teaching increment and the learning increment are predefined numbers adjustable after each iteration.

14. The method of claim 7, further comprising:
providing a final prediction based on a majority vote of the first classifier, the second classifier, and the third classifier.

15. The method of claim 7, reaching the stopping criterion comprises:
determining whether a student threshold of the prediction thresholds is at least as high as a teacher threshold of the prediction thresholds; and
reaching the stopping criterion upon determining that the student threshold is at least as high the teacher threshold.

16. A computer program product for model training using a teacher-student paradigm, the computer program product comprising a computer readable storage medium having program instructions embodied therewith, the program instructions executable by a processor to cause the processor to:
train a first classifier, a second classifier, and a third classifier using subsets of a labeled dataset;
predict a pseudo labeled dataset from an unlabeled dataset using the first classifier, the second classifier, and the third classifier;
assign a role to the first classifier, the second classifier, and the third classifier based on prediction thresholds and labeling agreements;
select a teaching sample dataset from the pseudo labeled dataset based on the role assigned to the third classifier;
retrain the third classifier using the teaching sample dataset and the labeled dataset;
update the prediction thresholds; and
reach a stopping criterion.

17. The computer program product of claim 16, wherein assign the role comprises instructions executable by the processor to cause the processor to:
- retrieve a first label and a corresponding first prediction probability of the first classifier made to a sample of the pseudo labeled dataset;
- retrieve a second label and a corresponding second prediction probability of the second classifier made to the sample of the pseudo labeled dataset;
- retrieve a third label and a corresponding third prediction probability of the third classifier made to the sample of the pseudo labeled dataset;
- assign a teacher role to the first classifier and the second classifier based on the first prediction probability and the second prediction probability exceeding a teaching threshold and based on the first label in agreement with the second label; and
- assign a student role to the third classifier based on the third prediction probability not exceeding a student threshold.

18. The computer program product of claim 16, wherein update the prediction thresholds comprises instructions executable by the processor to cause the processor to:
- decrease a teacher threshold of the prediction thresholds by a teaching increment; and
- increase a student threshold of the prediction thresholds by a learning increment.

19. The computer program product of claim 16, wherein reach the stopping criterion comprises instructions executable by the processor to cause the processor to:
- determining whether a student threshold of the prediction thresholds is at least as high as a teacher threshold of the prediction thresholds; and
- reaching the stopping criterion upon determining that the student threshold is at least as high the teacher threshold.

20. The computer program product of claim 16, wherein the subsets are determined by a bootstrapped labeled dataset of the labeled dataset.

* * * * *